United States Patent [19]

Hinterberger

[11] 4,153,955
[45] May 15, 1979

[54] SOLAR ENERGY CONVERTER

[76] Inventor: Henry Hinterberger, Rte. 1, Box 20-S, Batavia, Ill. 60510

[21] Appl. No.: 776,192

[22] Filed: Mar. 10, 1977

Related U.S. Application Data

[62] Division of Ser. No. 673,301, Apr. 1, 1976, abandoned.

[51] Int. Cl.² .................................................. E04H 3/16
[52] U.S. Cl. ........................................ 4/172; 4/172.15; 126/271; 165/66
[58] Field of Search .................. 4/172, 172.15, 172.17; 126/271; 210/169; 165/66

[56] References Cited

U.S. PATENT DOCUMENTS

| | | | |
|---|---|---|---|
| 2,455,605 | 12/1948 | Olson | 165/66 X |
| 3,844,338 | 10/1974 | Hilgemann et al. | 4/172 X |
| 3,868,945 | 3/1975 | Konopka et al. | 4/172.17 X |
| 3,906,928 | 9/1975 | Wright | 4/172.17 X |

Primary Examiner—Charles E. Phillips
Attorney, Agent, or Firm—Edmond T. Patnaude

[57] ABSTRACT

There is described a solar energy converter employing a stationary mirror which reflects and focuses solar radiation onto a bank of contiguous radiation concentrators through which a liquid is selectively passed as the focussed radiation passes thereacross as the elevation of the sun changes during the day.

5 Claims, 4 Drawing Figures

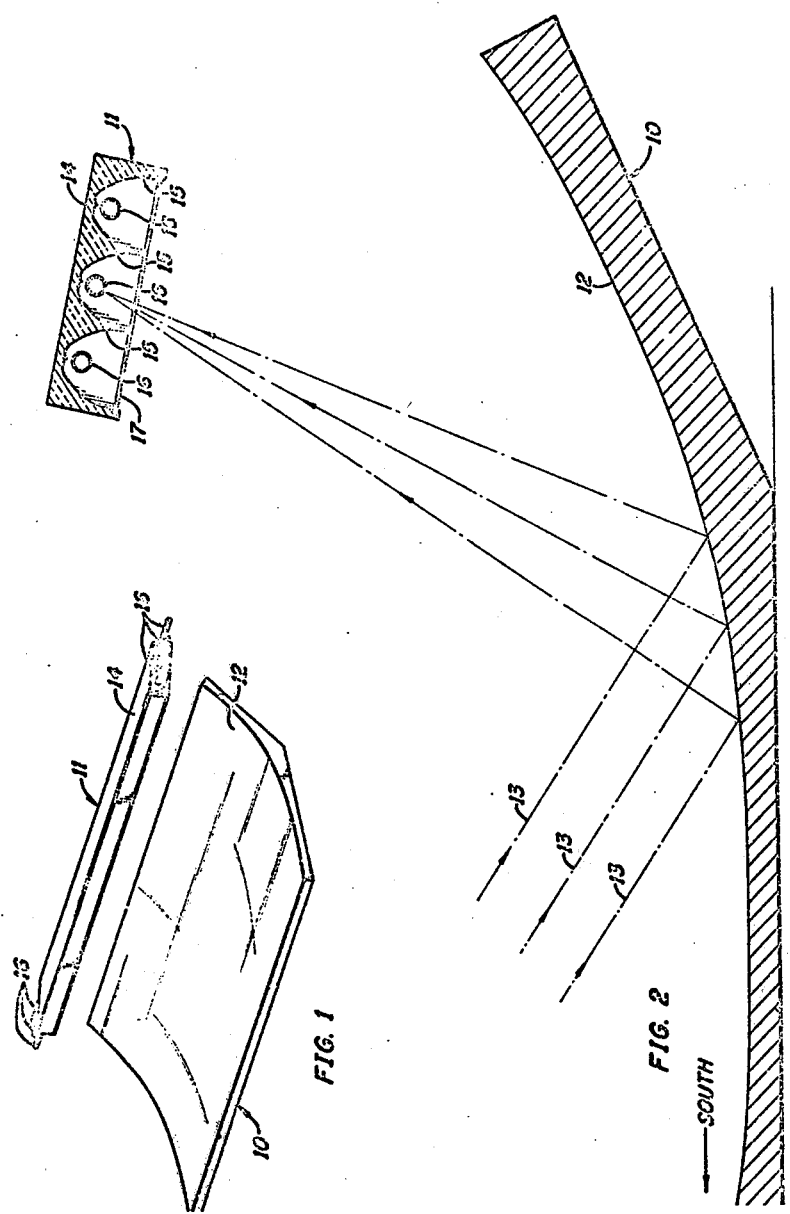

SOLAR ENERGY CONVERTER

This is a Division of application Ser. No. 673,301, filed Apr. 1, 1976.

The present invention relates in general to apparatus for heating a heat conductive transfer fluid with solar radiation, and it relates in particular to a new and improved non-tracking solar heating system employing a bank of radiation collectors onto which solar radiation is focussed by a stationary mirror.

BACKGROUND OF THE INVENTION

Various types of solar energy converters have been developed for utilizing solar radiation to heat a liquid. For example, in U.S. Pat. No. 3,321,012 there is described a bank of contiguous semi-cylindrical reflectors respectively containing heat conductive tubular members through which a fluid to be heated is passed. The solar rays are thus concentrated on the tubular members so that relatively high temperatures can be achieved. Improved reflector geometries for better concentrating the radiation at the surface of the fluid conducting tubes are described in an article appearing at page 255 in Volume 17 of SOLAR ENERGY published in 1975 by Pergamon Press, which article is entitled PRINCIPLES OF CYLINDRICAL CONCENTRATORS FOR SOLAR ENERGY. Other types of solar heat absorbtion panels are well known in the art.

For those applications wherein relatively high temperatures of, for example, 400° F. to 500° F. and above are required and, in addition, substantial amounts of heat energy are also required, it has generally been necessary to mount the radiation collectors in such a manner that they follow the sun as it travels across the sky. The initial manufacturing and installation costs of such equipment is, therefore, extremely high wherefore such equipment has not been economically competitive with other available sources of heat.

It would be desirable, therefore, to provide a non-tracking solar heat exchanger which can be used to raise the temperature of large quantities of a heat conducting fluid such, for example, as water, to temperatures of the order of 500° F. Such a heat exchanger could then be used for many applications including domestic heating and air conditioning, power generation, solar pond regeneration and heating and sterilizing the water in swimming pools.

Swimming pools ordinarily are maintained in a relatively sterile condition by the addition thereto of chemicals. Many persons find such chemicals to be objectionable, but for economic reasons no better means has heretofor been found for purifying the water in swimming pools. Because it is necessary in many geographic areas continuously to heat the water in swimming pools to maintain the pool at a suitable temperature for swimming, it would be desirable to utilize the same heater which heats the water to also purify it, thereby obviating the use of noxious chemicals for purposes of water purification.

SUMMARY OF THE INVENTION

Briefly, there is provided in accordance with one aspect of the present invention a solar converter including a mirror for focusing the solar rays intercepted thereby onto a radiation receiver comprising a bank of contiguous, horizontally disposed radiation collectors facing toward the mirror. The mirror focuses the solar rays into a narrow horizontal band which moves up and down across the radiation collectors as the sun makes its daily trajectory across the sky. The radiation collectors thus successively intercept the band of solar radiation with usually one but at most two collectors receiving the radiation at any given time. By means of suitable temperature responsive valve controls the heat conducting fluid is made to flow only through the one or two radiation collectors which are intercepting the band of focused solar rays at any given time. Accordingly, in this system it is possible to achieve substantially higher liquid temperatures than is possible with those similar radiation collectors having a plurality of heat transfer conduits through which heat conducting fluid is continuously passed. Other advantages of this solar heat converter system will become apparent as this description proceeds.

In accordance with another aspect of the present invention, there is provided a system for both heating and purifying the water in a swimming pool. My solar energy converter, briefly described hereinabove, is particularly suited for use in this water heating and purifying system because of the high water temperatures which can be obtained. These high temperatures enable the rapid sterilization of the water. This novel water heating and purification system employs a heat exchanger which functions to lower the very high temperature of the water exiting the heater before it is returned to the pool and to increase the temperature of the water entering the heater.

BRIEF DESCRIPTION OF THE DRAWINGS

Further objects and advantages and a better understanding of the present invention can be had by reference to the following detailed description, wherein:

FIG. 1 is a perspective view of a solar energy converter embodying the present invention;

FIG. 2 is a vertical elevational view, in cross-section of the solar energy converter system shown in FIG. 1;

Referring to FIGS. 1 and 2 wherein is shown a portion of a solar energy converter system embodying the present invention, a trough-like, elongated mirror or reflector 10 is positioned to intercept solar radiation and to focus it onto an elongated receiver 11. In FIG. 2, the solar rays are schematically indicated at 13. The reflector 10 has an upper reflecting surface 12 which in vertical cross section is parabolic and focusses the solar rays into a narrow rectilinear horizontal band which is intercepted by the receiver 11. As shown in FIG. 2, the left hand side of the reflector 10 faces due South for maximum efficiency of the system. Consequently, as the sun moves in a substantial arc across the sky during its daily excursion, the focussed band of solar radiation moves up across the receiver 11 (from left to right in FIG. 2) and then back down (from right to left in FIG. 2). Near sunrise and sunset one end or the other of the receiver 11 does not receive the focussed radiation but this so-called end effect may be minimized by utilizing a relatively long reflector 10.

Figure 3:
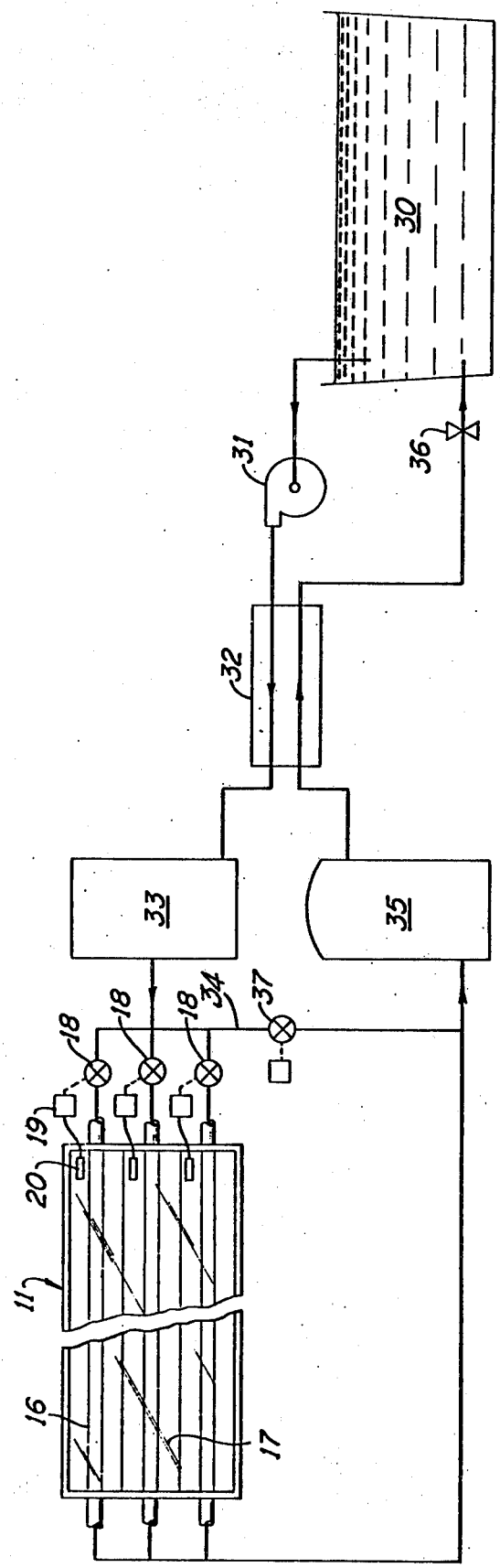
FIG. 3 is a flow diagram of a swimming pool heating and purification system which is adapted to use the solar energy converter of FIG. 1.

The receiver 11 comprises an elongated, horizontally extending, thermal insulating member 14 having therein a plurality of downwardly opening troughs having a reflective surface 15 thereby to provide a plurality of contiguous optical funnels. Preferably the funnels extend throughout the full length of the receiver and have a geometry as shown in FIG. 3 of the above referred to article in the SOLAR ENERGY publication. However, other geometric configurations for the funnels may be used without departing from the present invention. A plurality of straight horizontally disposed heat conductive conduits 16 respectively extend through the funnels 15 for carrying a heat conductive transfer fluid therethrough. The solar rays intercepted by the optical funnels are concentrated onto the surfaces of the conduits 16 to heat the fluid flowing therethrough. A transparent heat insulating window 17 encloses the radiation collectors to reduce thermal losses.

It is to be noted that in this geometry of receiver 11, convective thermal losses are eliminated due to the fact that the conduits 16 are above the window 17, thus, air heated by the conduits rises and is trapped without reaching the window 17, and losing heat thereto.

As shown in FIG. 3 the conduits 16 in the receiver 11 are respectively supplied with the heat conductive fluid through a plurality of solenoid controlled valves 18. Each of these valves 18 is actuated by a switch 19 which is closed by an associated thermal probe 20 when the temperature in the associated optical funnel is at at least a predetermined value. In practice, the thermostat combinations 19, 20 are adjusted to open the associated values 18 only when the focussed band of solar radiation is intercepted by the associated collector funnel. Accordingly the fluid to be heated does not pass through the inactive funnels wherefore substantially higher temperatures can be achieved because of the elimination of thermal loss from those conduits 16 which are not illuminated.

In order to achieve a high degree of efficiency, the reflector 10 should be periodically adjusted to vary the angle of tilt thereof relative to the horizontal. For example, a greater tilt is preferable in the winter months when the maximum elevation of the sun is substantially less than in the summer months.

Figure 4:
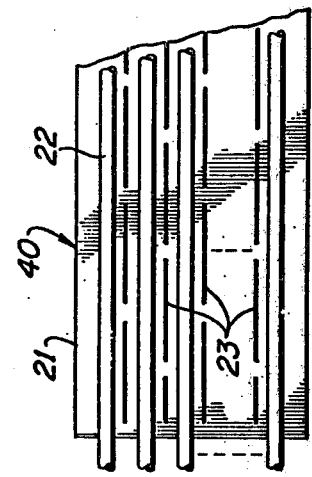
FIG. 4 is a fragmentary plan view of a different solar collector means which can be used in the system of FIG. 1.

In FIG. 4 there is shown a solar radiation absorption panel 20 which may be used in place of the receiver 11 in FIG. 2. The panel 20 comprises a backing member 21 to which a plurality of conductive tubes 22 are mounted in spaced parallel relationship. Each of the tubes 22 is provided with a control valve (not shown) so that the heat transfer fluid flows only through those tubes 22 which intercept the band of focussed solar rays. The backing member 21 is provided with a plurality of slits 23 between the tubes 22 and parallel thereto for reducing conduction between the heated and unheated portions of the panel. Another method of fabricating the panel 20 is to bond two sheets of metal such as aluminum together in all areas except where fluid passages are desired. These fluid passages are then created by peneumatic pressure. The overall appearance of the panel 20 created by this process is the same as shown in FIG. 4, that is, each fluid passage is thermostatically controlled and slits isolate adjacent passages. While the receiver 11 employs optical funnels for solar radiation concentration on the conduits 16 and is thus more efficient in operation, the panel 20 has the advantage that it is less expensive to construct and has application where lesser temperatures are required.

Referring now to FIG. 3, there is shown a system for heating and purifying the water in a swimming pool. As there shown, water in a pool 30 is pumped by a pump 31 through a heat exchanger 32 and an auxiliary heater 33 to a manifold 34 to which the inlet ports of the valves 18 are connected. The outlets from the conduits 16 are connected to a thermally insulated holding tank 35 from which water flows through the heat exchanger 32 and a pressure reducer 36 back to the pool 30. The pressure reducer 36 is set to maintain the pressure in the receiver at a value which prevents boiling at the operating temperature.

If no sunlight is available, the valves 18 are all closed. This causes a rise in pressure in the manifold 34 which in turn causes the pressure sensitive bypass valve 37 to open. The auxiliary heater 33 may be actuated by a temperature sensing control in the holding tank 35.

Assuming the pool 30 to be a swimming pool, the desired temperature of the water is generally in the range of about 70° F. to 80° F. As it passes from the pool through the heat exchanger 32 the temperature of the water will be increased. The auxiliary heater 33 is provided for use when the main heater 11 is not operative. For example, where the heater 11 is solar operated, the heater 33 is used on cloudy or overcast days when additional heating is required.

As the water passes through the open conduits 16 its temperature is raised above the sterilization level to say 300° F. and it is held at about this temperature in the tank 35 until the water is sufficiently purified. The volume of the tank 35 is calculated to achieve the necessary holding time for sterilizing the water and maintaining the pool at the desired temperature and varies with such things as pool size and normal ambient temperatures.

The total amount of heat dissipated for a given rate of water flow through the system is determined by the difference in temperature between the water entering the heat exchanger from the pool and the water returning to the pool. For a well designed heat exchanger the temperature difference is less than 20° F. This is less than ten percent of the temperature rise the water experiences in passing through the unit 11. This rise in water temperature serves to maintain the water in the pool at a comfortable temperature for swimming.

The heating and sterilizing system of the present invention thus eliminates the cost of chemicals heretofore used for purification of swimming pools at a cost no greater than that ordinarily expended for simply heating the pool. Where the heater and sterilizer unit is operated with solar energy the overall operating cost can be relatively small.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A system for heating and sterilizing the water in a swimming pool, comprising a heat exchanger having first and second heat exchange passageways therethrough, water heater means for raising the temperature of water passed therethrough to a sterilizing temperature, means for causing water from said pool to flow through said first passageway, then through said water heater means, then through said second passageway, and then to said pool, a pressure reducer connected between said second passageway and said pool, and a holding tank connected between said water heater means and said second passageway.

2. A system according to claim 1 wherein said water heater means comprises a solar heater.

3. A system according to claim 2 wherein said water heater means comprises another water heater in addition to said solar heater, and valve means for interrupting the flow of water through said solar heater.

4. A system according to claim 1 wherein the water flowing through said first and second heat exchange passageways has a temperature differential less than 20° F.

5. A system according to claim 1 wherein said water heater means comprises
a solar water heater and another water heater connected in series relationship between said first and second heat exchange passageways,
first valve means connected between said water heaters for interrupting the flow of water to said solar water heater, and
a valved passageway connected from the outlet of said another heater to said second heat exchange passageway,
whereby said first valve means can be closed to prevent the flow of water through said solar water heater while maintaining said system in operation.

* * * * *

UNITED STATES PATENT AND TRADEMARK OFFICE
CERTIFICATE OF CORRECTION

PATENT NO. : 4,153,955

DATED : May 15, 1979

INVENTOR(S) : Henry Hinterberger

It is certified that error appears in the above-identified patent and that said Letters Patent are hereby corrected as shown below:

Claim 1. A system for heating and sterilizing the water in a swimming pool, comprising a heat exchanger having first and second heat exchange passageways therethrough, water heater means for raising the temperature of water passed therethrough to a sterilizing temperature, means for causing water from said pool to flow through said first passageway, then through said water heater means, then through said second passageway, and then to said pool, a pressure reducer connected between said second passageway and said pool, and a holding tank connected between said water heater means and said second passageway.

UNITED STATES PATENT AND TRADEMARK OFFICE
CERTIFICATE OF CORRECTION

PATENT NO. : 4,153,955
DATED : May 15, 1979
INVENTOR(S) : Henry Hinterberger

It is certified that error appears in the above-identified patent and that said Letters Patent are hereby corrected as shown below:

Claim 3.  A system according to claim 2 wherein said water heater means comprises another water heater in addition to said solar heater, and valve means for interrupting the flow of water through said solar heater.

Signed and Sealed this

Twenty-eighth Day of August 1979

[SEAL]

Attest:

Attesting Officer

LUTRELLE F. PARKER
Acting Commissioner of Patents and Trademarks